June 18, 1957 — W. STELZER — 2,796,252
WEIGHING SCALES
Filed Nov. 17, 1953 — 2 Sheets-Sheet 1
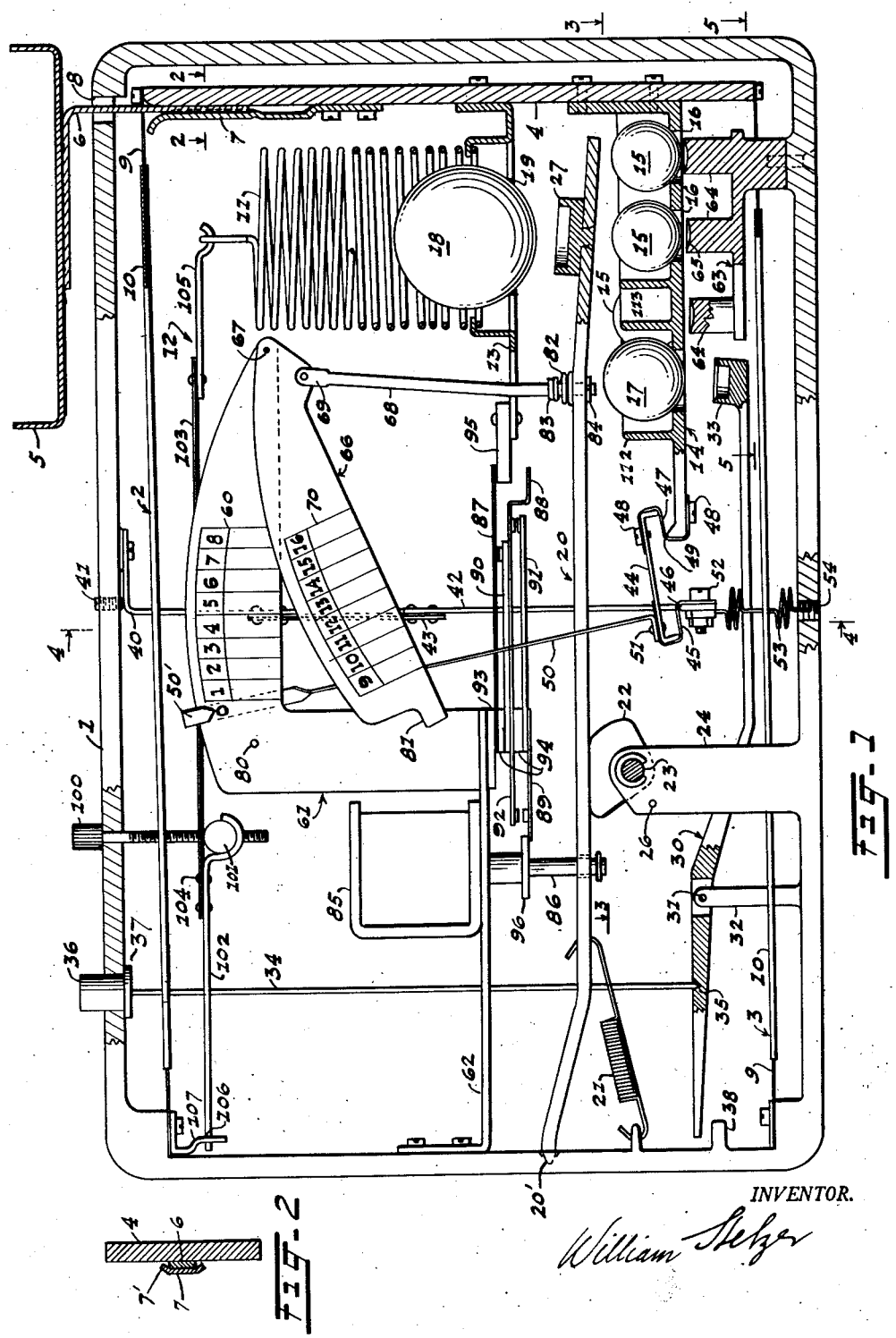
INVENTOR.
William Stelzer June 18, 1957 W. STELZER 2,796,252
WEIGHING SCALES
Filed Nov. 17, 1953 2 Sheets-Sheet 2
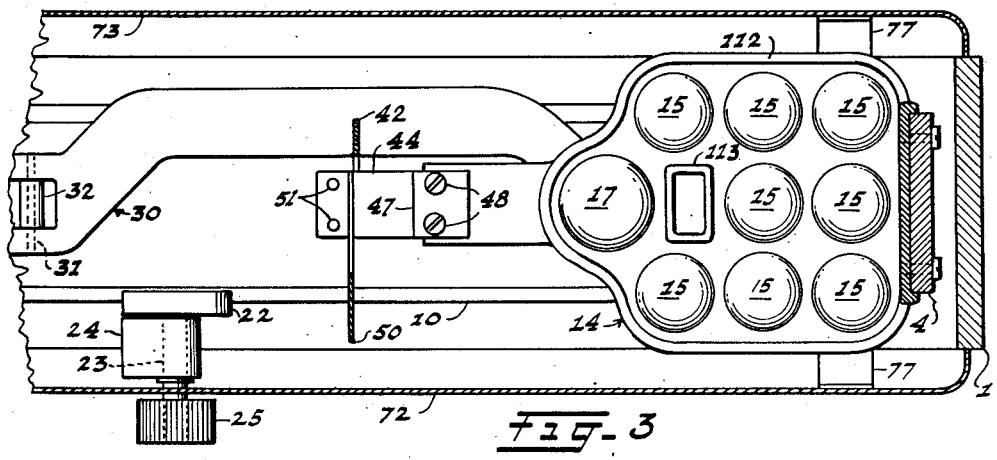
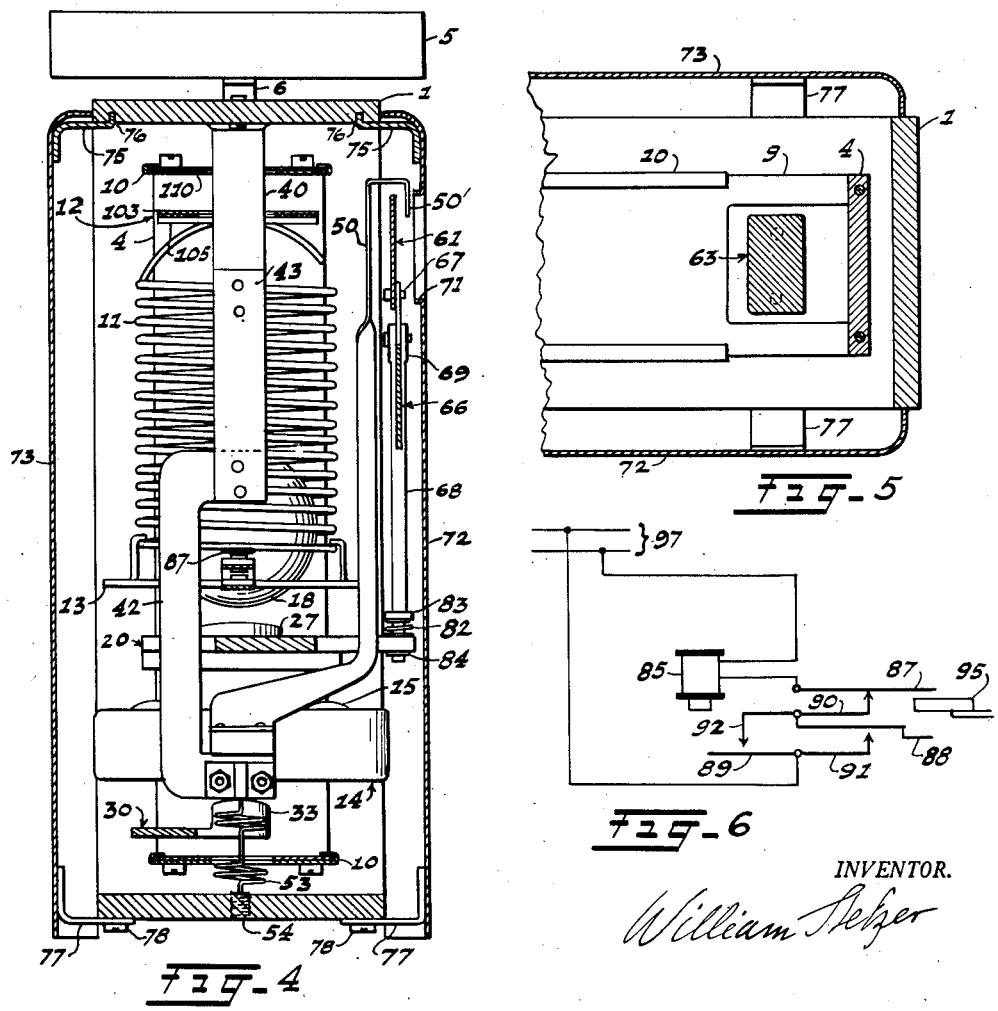
INVENTOR.
William Stelzer

United States Patent Office 2,796,252
Patented June 18, 1957

2,796,252

WEIGHING SCALES

William Stelzer, Summit, N. J.

Application November 17, 1953, Serial No. 392,636

11 Claims. (Cl. 265—48)

The invention relates to weighing scales and more particularly to self-indicating or automatic computing weighers where a resistant adjusted to produce a constant force is arranged to oppose the load, the load being complemented by counterweights to approximate the force of the resistant.

This invention uses the principle disclosed in my co-pending application Ser. No. 180,620, filed August 21, 1950, now Patent 2,681,222, according to which a weight depositing scale having a high degree of accuracy can be constructed very cheaply.

The object of my invention is to construct an automatic computing weigher, suitable as a postal scale, with a constant resistant and with self-depositing counterweights complementing the load, and indicating means to facilitate the reading of the weight of the goods or the particular value of said weight corresponding to different unitary prices.

Another object is to provide simple means on the load carrying member to carry the complemental or counterweights, the latter being deposited successively on stationary supports as the load carrying member descends in response to the gravitational force of the load.

Another object is to provide means to facilitate the use of spherical weights which can be manufactured more cheaply than other forms of weights, and to construct such means so that the weights can be picked up or deposited successively with a minimum movement of the load carrying member, the spherical weights being confined in a manner affording portability of the weigher.

Another object is to use a spring as a resistant and to compensate for the rate of the spring so that the load carrying member when carrying all the counterweights and no load is in balance at any point in its vertical path whereby in weighing a load, the automatic successive deposition of counterweights causes a step-like indication of the weighing result where the indicator points directly at a numeral which represents the weight, value, or postage.

A further object is to vary the range of the scale so that smaller or larger loads can be weighed, and to provide means where the selection can be made manually by turning a knob, or fully automatically in which case a source of power is used.

A still further object is to combine the indicating device and the means for compensating for the rate of the spring-type resistant into one to obtain a certain simplification of construction.

Other objects and advantages of this invention will be apparent from the following description considered in connection with the accompanying drawings submitted for the purpose of illustration and not to define the scope of the invention, reference being had for that purpose to the subjoined claims. In the drawings, wherein similar reference characters refer to similar parts throughout the several views:

Fig. 1 is a front elevation of the novel weighing scale, part of it being shown in section, and the covers removed;

Fig. 2, a section taken on lines 2—2 of Fig. 1 through the load carrying member;

Fig. 3, a section taken on lines 3—3 of Fig. 1;

Fig. 4, a section taken on lines 4—4 of Fig. 1;

Fig. 5, a section taken on lines 5—5 of Fig. 1; and

Fig. 6, a diagram of the electric circuit of the apparatus for automatically changing the range of the weighing scale.

Before explaining the present invention in detail, it is to be understood that the invention is not limited in its application to the details of construction and arrangement of elements illustrated in the accompanying drawings, since the invention is capable of other embodiments and of being practised or carried out in different ways. Also it is to be understood that the phraseology or terminology employed herein is for the purpose of description and not limitation.

The construction shown comprises a rectangular frame 1 supporting the ends of a pair of parallel check links 2 and 3, the free ends of which are attached to a vertical load carrying member or spider 4 whose upper end carries a platter 5 through the medium of a bracket 6 held in yieldable engagement with load carrying member 4 by a leaf spring 7. This spring prevents the transmission of excessive forces on check links 2 and 3, as a jar or too heavy load acting in any direction on platter 5 causes spring 7 to yield so that the platter simply comes to rest on frame 1, or bracket 6 rests against the side walls of hole 8 in frame 1 through which the bracket extends. The sides 7' of spring 7 retain bracket 6 sidewise, as illustrated in Fig. 2. The check links 2 and 3 consist of thin leaf-springs or metallic bands 9 stiffened in the intermediate portion by reinforcements 10 made of sheet metal and having their lateral edges folded over bands 9 so that the latter are firmly held. The ends of the bands intermediate their supports and the reinforcement are lightened as shown in Fig. 5 to decrease the resistance to bending.

A resistant consisting of a tension spring 11 is supported by an adjustable arm 12 and engages at its lower end a bracket 13 secured to load carrying member 4 so that spring 11 urges load carrying member 4 vertically upward to oppose the gravitational force acting on the latter. Another bracket or shelf 14 secured to load carrying member 4 serves to support a plurality of spherical complemental weights or counterweights 15 of equal weight seated on the edges of holes 16.

A ballast weight 17 of a different weight also rests on shelf 14. Its weight may be half of that of weights 15. If weights 15 are one ounce, weight 17 should weigh one half ounce. It is shown larger than the other weights because it is preferably made of a lighter metal, such as aluminum, or of glass, so that less accuracy in the lifting mechanism is required, which will be explained later. Bracket 13 supports a large ballast weight 18 seated on the edge of hole 19. The ballast weight 18 does not weigh more than all the counterweights combined. This weight serves to increase the weighing range of the scale when it is removed from shelf 13 by an operable arm 20 hinged to the frame at 20', springs 21 urging arm 20 downwardly against a manually operable cam 22 secured to a shaft 23 revolving in post 24 extending upwardly from frame 1. Shaft 23 carries a hand knob 25 shown in Fig. 3. Rotation towards the left until cam 22 abuts against pin 26 lifts arm 20, whereby its cup 27 picks up spherical weight 18. Weight 17 also serves to increase the weighing range, though in a downward direction, i. e., to measure smaller values than those represented by weights 15. To lift weight 17, I provide a double armed lever 30 having its fulcrum at 31 where it is supported by a post 32 extending upwardly from frame 1. One arm has at its end a cup 33 positioned to lift up ball 17 when the other arm engaged by a push rod 34 is depressed. The latter has a pointed end fitting into a socket 35 of lever 30 while the upper end carries a push button 36 extending through a hole in the top of frame 1. Flange 37 of button 36 serves as a stop to limit the downward movement of the longer one of the two arms, this longer arm being of sufficient weight to urge lever 30 into the position shown. Movement of lever 30 in the opposite direction is limited by stop 38.

Spring 11 is of such strength or so adjusted that it counterbalances the gravitational force acting on load carrying member 4 when the latter carries all the weights and no load. The aim is to obtain a balance at any point of the vertical path of load carrying member 4. According to the rate of the spring, the force of the latter increases as it is extended, so that with the elements so far described a balance could be obtained only in one position. To compensate for the rate of spring 11 as well as for the rate of the leaf springs 9 of check links 2 and 3 during the entire travel of member 4, a leaf spring 40 secured to frame 1 and adjustable by an adjusting screw 41 tends to increase the lifting force acting on member 4 as the latter ascends from a midposition. While member 4 descends below the midposition, the lifting force is gradually reduced. This action causes a compensation for the increase in the force of spring 11 as it is being extended during the entire travel of member 4. Spring 40 has an extension 42 with a bimetal 43 interposed. This bimetal may be used to compensate for errors due to extreme temperature changes, since spring 40 becomes weaker at higher temperatures. Spring 40 acts to urge extension 42 to swing in a direction towards bracket 14 and to transmit a force in a horizontal direction to the latter by means of a toggle link 44 pivoted to extension 42 by a flexible ribbon 45, preferably of fabric, the pivot point being at or near 46, and pivoted to bracket 14 by a similar ribbon 47 secured to link 44 and bracket 14 by screws 48, the pivot point being at or near 49. Link 44 is in a horizontal position when member 4 has ascended half its stroke. The movement of link 44 is used to operate indicator or pointer 50, the latter being secured to link 44 as with rivets 51 with one end of ribbon 45 interposed to secure the latter, the other end of ribbon 45 being clamped to extension 42 by a screw 52 which at the same time secures one axial end of a vertical toggle spring 53 whose other axial end is snugly and revolubly held in an axial hole of an adjusting screw 54. Spring 53 presses upwardly against extension 42. The coils of the spring near the ends permit bending so that spring 40 and spring 53 together form a toggle, whereby spring 53 serves to compensate for the rate of spring 40. The general principle of such a compensating spring has already been explained in my co-pending application Serial No. 388,173, filed October 26, 1953, now Patent 2,739,806.

Indicator or pointer 50 has a pointing end 50' pointing at a chart 60 printed on a fixed dial 61 secured to a bracket 62 attached to frame 1. Pointer 50 always points at the center of a vertical column of chart 60 by virtue of a steplike deposition of weights 15 onto a rack 63 when member 4 descends. Rack 63 is secured to frame 1 and comprises a plurality of supports 64, one for each weight 15 vertically below the latter. Each support 64 has a spherically curved seat 65, where the spherical radius of the seat is somewhat larger than the spherical radius of balls 15. While supports 64 and holes 16 are held in vertical alignment as much as possible, it is of course obvious that in mass production, where rack 63 and shelf 14 may be made of die castings receiving no special machining, certain tolerances have to be allowed. By making the spherical radius of seat 65 larger than that of ball 15, ball 15 when depositing itself on seat 65 during descent of member 4 comes into contact with the bottom or central portion of seat 65 first so that any axial misalignment causes only the slightest variation in height where the deposition takes place. Seats 65 are staggered in height so that during descent of member 4 one weight after another becomes seated, or during ascent weights 15 are successively picked up by shelf 14. The arrangement described, where the spherical radius of seat 65 is larger, permits the minimum distance between stations where weights are deposited so that the total stroke or travel of load carrying member 4 may be kept at a minimum. This is important as far as the accuracy of the scale is concerned because it is easier to compensate for the rate of spring 11 when the movement is short.

In the embodiment shown, chart 60 has a range of one to eight ounces, as indicated by the numerals shown. Below them the chart may contain other numerals representing the value of the goods weighed, or postage. If the range is to be increased above eight ounces, ballast weight 18 is lifted up by cup 27 when knob 25 is turned. A second dial 66 is pivoted at 67 to dial 61 and operatively connected with arm 20 by a link 68 having a clevis end 69 engaging dial 66, so that when arm 20 is raised to remove weight 18 from bracket 13, dial 66, which has a chart 70 printed on it, is superimposed over dial 61 so that only chart 70 is visible through window 71 of front cover 72, the latter being shown in Fig. 4. A similar cover 73 is used in the back, without a window. Both covers are secured to frame 1 by lugs 75 welded to the covers and entering into slots 76 in the top portion of frame 1. At the bottom, lugs 77 extending from the covers are secured to the bottom of frame 1 as with screws 78. To arrest dial 66 in the proper place a pin 80 serves as a stop against which abutment 81 of dial 66 comes to rest. Overtravel of arm 20 is permitted by a spring 82 between shoulder 83 of link 68 and arm 20, 84 indicating a snap ring attached to link 68, the latter extending through a hole in arm 20.

Arm 20 can also be operated automatically by power. For this purpose a solenoid 85 is secured to bracket 62 and adapted to lift arm 20 by means of a plunger 86 which ascends when solenoid 85 is energized. To control the latter, electric contacts operated by movement of member 4 may be used. The arrangement shows contact springs 87, 88, and 89, and rigid contact arms 90, 91, and 92, with insulating plates 93 and 94 interposed. An insulated finger 95 riveted to bracket 13 breaks contact between spring 87 and arm 90 when member 4 has ascended to the topmost position, and makes contact between spring 88 and arm 91 when member 4 has descended fully where all weights 15 are deposited on supports 64. Solenoid plunger 86 has secured to it an insulated flange 96 to break the contact between spring 89 and arm 92 when the solenoid is deenergized and plunger 86 rests on spring 89. Fig. 6 shows a diagram of the connection of the contacts with the solenoid and the line 97.

To adjust spring 11 to balance the gravitational load on member 4 as described, I provide an adjusting screw 100 extending through frame 1 and threading into a nut 101 held between end piece 102 and bimetal strip 103 held together with rivets 104. The bimetal strip serves to compensate for variations in the force of spring 11 due to changes in temperature. With increased temperature the bimetal strip tends to raise the spring supporting end 105 of arm 12 to stretch spring 11 further when it becomes weakened due to a higher temperature. End piece 102 is pivotally held at 106 by a bracket 107 which is used at the same time to clamp the ends of band 9 of link 2 securely to frame 1. In the illustration shown in Fig. 1, there are several vertically disposed elements crossing horizontal elements without touching them. Thus rod 34 passes through clearance holes in check link 2, end portion 102 of arm 12, bracket 62, and arm 20.

Spring 40 extends through hole 110 of check link 2. Post 32 passes through a clearance hole in check link 3. Another clearance hole is provided in check link 3 for spring 53. Present weight depositing weighers have the drawback that they are not portable. If the apparatus is tilted so that the weights have shifted from their seats, they must be returned by hand. This is not necessary in the new device since weights 15 and 17 are retained by walls 112, 113, and arm 20, so that they are returned onto their seats automatically. Weight 18 is confined within spring 11.

In operation, it is first ascertained that the scale is in balance, the balance having been established by adjustment of screw 100 to zeroize pointer 50. While it may not be possible to cause pointer 50 to come to rest pointing at zero on chart 60 due to the lability of member 4 when properly balanced, the pointer will nevertheless fluctuate between numeral 1 and a point left of zero, and the slightest load on platter 5 will cause pointer 50 to point to numeral 1 of chart 60. If a load to be weighed is placed on platter 5, member 4 with its attached parts and weights descends, depositing one after another of its weights 15 until a balance is reached. If the load is, for example, four and a fraction of an ounce, then four of balls 15 are deposited and a fifth one has part of its weight resting on its corresponding support 64. The pointer then points at numeral 5. This would be the number of ounces for which postage has to be paid. If it is desired to determine the weight in half ounces, as for foreign air mail or for other than postal uses, button 36 is depressed. This rocks lever 30 in a direction to lift ball 17 from its seat to be supported by seat 33 of lever 30, whereby the total gravitational force acting on member 4 is reduced ½ ounce. If the reading remains unchanged, it is the correct weight for which postage must be paid, as apparently the weight of the load is over 4½ ounces. If, after button 36 is depressed, the pointer changes to numeral 4, the weight of the load is apparently less than 4½ ounces but more than 4, so that postage would have to be paid for 4½ ounces. Upon removal of the load from platter 5, member 4 ascends and weights 15 are picked up again. Supposing the load placed on platter 5 is more than 8 ounces and less than one pound, all of the balls 15 are deposited and the pointer points to the space beyond numeral 8. This is an indication that the load is beyond the range of chart 60. By turning knob 25 to lift arm 20, weight 18 which in the example weighs 8 ounces, is picked up by seat 27 so that the total load is lightened by 8 ounces. The upward movement of arm 20 simultaneously lifts dial 66 so that chart 70 becomes visible instead of chart 60. If the load on platter 5, for example, is 9 and a fraction of an ounce, member 4 ascends to pick up weights 15 until the pointer points at the vertical column which contains numeral 10, this being the weight for which postage would have to be paid.

If the weighing scale comprises solenoid 85 and a source of electric power is connected, then if the load on platter 5 is more than 8 ounces, it is not necessary to turn knob 25 since finger 95 presses on contact spring 88 to close the contact between arm 91 and spring 88 to close the circuit energizing solenoid 85 to lift arm 20. As soon as plunger 86 ascends the contact is closed between spring 89 and arm 92 so that the solenoid remains energized even though the contact between spring 88 and arm 91 is broken when member 4 ascends again after deposition of weight 18 on cap 27. The weight indication remains the same as when weight 18 is lifted by manual power. When the load is removed from platter 5, member 4 ascends to the topmost position to break the contact between spring 87 and arm 90 to open the circuit whereby solenoid 85 becomes deenergized and arm 20 returns to the released position shown.

I claim:

1. An automatic computing weigher comprising a vertically movable load carrying member to support a load to be weighed, means to guide said load carrying member to provide a parallel motion where all points have the same velocity, means including a resistant arranged to oppose the gravitational force of said load carrying member by a constant force, a plurality of spherical counterweights of equal weight supported by said load carrying member, stationary supports to successively seat one counterweight after another during the descent of said load carrying member, whereby in the lowest position of said load carrying member all of said counterweights rest on said stationary supports, and in the highest position all counterweights are supported by said load carrying member, and indicating means responsive to the position of said load carrying member to indicate the value representing the weight of said load, each of said supports having a spherically curved seat, the spherical radius of said seat being larger than the spherical redius of said weights.

2. An automatic computing weigher comprising a vertically movable load carrying member to support a load to be weighed, means to guide said load carrying member to provide a parallel motion where all points have the same velocity, a spring type resistant arranged to oppose the gravitational force of said load carrying member, a plurality of spherical counterweights of known weight supported by said load carrying member, stationary supporting means on which said counterweights are successively deposited at spaced intervals during the descent of said load carrying member so as to gradually relieve said load carrying member of the burden of said counterweights, the force of said resistant being adjusted to exactly counterbalance the gravitational force of said load carrying member carrying all counterweights but no load, means to compensate for the rate of said spring-type resistant so that the force opposing the gravitational force of said load carrying member is constant in any position of said load carrying member, and indicating means comprising a pointer and a graduated fixed chart showing different weights, said pointer being responsive to the position of said load carrying member to indicate the weight of said load on said chart.

3. The construction as claimed in claim 2, ballast carried by said load carrying member, and manually operable lifting means to remove said ballast from said load carrying member, whereby removal of said ballast increases the capacity of said weigher, said ballast weighing not more than all counterweights combined, said resistant being of a sufficient force to suspend said load carrying member when all of said counterweights and said ballast are carried by said load carrying member with no load.

4. The construction as claimed in claim 3, a second chart, said second chart being movable to be superimposed on said first mentioned fixed chart, and means operatively connected with said lifting means to superimpose said second chart on said fixed chart when said ballast is removed from said load carrying member.

5. The construction as claimed in claim 2, a ballast weight carried by said load carrying member and weighing not more than all of said counterweights combined, a second ballast weight carried by said load carrying member and weighing half as much as one of said counterweights, and manually operable means to selectively lift said ballast weights from said load carrying member to change the load carrying capacity of said weigher.

6. A weigher comprising a vertically movable load carrying member to support a load to be weighed, means including a resistant arranged to oppose the gravitational force of said load carrying member by a constant force, a plurality of spherical counterweights of known weight, supported by said load carrying member, stationary supporting means to successively seat said counterweights at spaced intervals during the descent of said load carrying member so as to gradually relieve said load carrying member of the burden of said counterweights, said stationary supporting means comprising cup-shaped supports having a spherical radius larger than the spherical radius on said counterweights, a removable ballast weight carried by said load carrying member, lifting means comprising a solenoid operatively connected to lift said ballast weight from said load carrying member, a source of power to energize said solenoid, means responsive to the lowest position of said load carrying member to energize said solenoid, and means responsive to the topmost position of said load carrying member to deenergize said solenoid.

7. An automatic computing weigher comprising a vertically movable load carrying member to support a load to be weighed, means to guide said load carrying member to provide a parallel motion where all points have the same velocity, a spring type resistant arranged to oppose the gravitational force of said load carrying member, a plurality of spherical counterweights of known weight supported by said load carrying member, stationary supporting means on which said counterweights are successively deposited at spaced intervals during the descent of said load carrying member so as to gradually relieve said load carrying member of the burden of said counterweights, the force of said resistant being adjusted to exactly counterbalance the gravitational force of said load carrying member carrying all counterweights but no load, and means to compensate for the rate of said spring-type resistant comprising a link, a leaf spring arranged to press said link toward said load carrying member, said link being positioned intermediate said leaf spring and said load carrying member, one end of said link being flexibly connected to said load carrying member, and the other end of said link being flexibly connected to said leaf spring.

8. The construction as claimed in claim 7, and means to compensate for the rate of said leaf spring.

9. The construction as claimed in claim 7, and a pointer secured to said link to indicate the weight of the load weighed.

10. The construction as claimed in claim 2, and bimetal means to compensate for weakening of the force of said resistant due to changes in temperature.

11. The construction as claimed in claim 2, where said means to compensate for the rate of said spring-type resistant comprises a toggle link, resilient means to exert a force in a horizontal direction towards said load carrying member, said toggle link having one end constrained to move horizontally and engaged by said resilient means to be urged toward said load carrying member, the other end of said toggle link engaging a part of said load carrying member, said toggle link being horizontal when said load carrying member is in a position where it has ascended half its stroke.

References Cited in the file of this patent

UNITED STATES PATENTS

| | | |
|---|---|---|
| 674,206 | De Janisch | May 14, 1901 |
| 1,057,324 | Briggs | Mar. 25, 1913 |
| 1,106,799 | Gilbert | Aug. 11, 1914 |
| 1,566,994 | Spiro et al. | Dec. 22, 1925 |
| 1,599,529 | Hoffer | Sept. 14, 1926 |
| 2,368,655 | Fraps | Feb. 6, 1945 |
| 2,681,222 | Stelzer | June 15, 1954 |

FOREIGN PATENTS

| | | |
|---|---|---|
| 16,769 | Germany | Jan. 31, 1882 |
| 292,517 | Great Britain | Nov. 22, 1928 |
| 549,316 | Great Britain | Nov. 16, 1942 |